(12) United States Patent
Hariram

(10) Patent No.: US 9,969,036 B2
(45) Date of Patent: May 15, 2018

(54) FIREPROOF FLEXIBLE HOSES WITH POLYIMIDE INNER STRUCTURES

(71) Applicant: The Boeing Company, Chicago, IL (US)

(72) Inventor: Sham S. Hariram, Seattle, WA (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 14/542,751

(22) Filed: Nov. 17, 2014

(65) Prior Publication Data

US 2016/0138737 A1 May 19, 2016

(51) Int. Cl.
| | | |
|---|---|---|
| *B23P 19/00* | (2006.01) | |
| *F16L 11/118* | (2006.01) | |
| *F16L 11/12* | (2006.01) | |
| *F16L 11/10* | (2006.01) | |

(52) U.S. Cl.
CPC ............... *B23P 19/00* (2013.01); *F16L 11/10* (2013.01); *F16L 11/118* (2013.01); *F16L 11/125* (2013.01)

(58) Field of Classification Search
None
See application file for complete search history.

(56) References Cited

U.S. PATENT DOCUMENTS

| | | | | |
|---|---|---|---|---|
| 5,179,153 A | * | 1/1993 | George | ................... C08K 3/04 524/495 |
| 8,127,800 B2 | | 3/2012 | Ramaswamy et al. | |
| 2003/0012908 A1 | * | 1/2003 | Milhas | ................... F16L 9/121 428/36.91 |
| 2007/0141284 A1 | | 6/2007 | Carpenter et al. | |

(Continued)

FOREIGN PATENT DOCUMENTS

EP 0313416 A2 4/1989

OTHER PUBLICATIONS

"Aerospace Materials: Your High Temperature Solutions", UBE America Inc., Retrieved from the Internet: <http://www.ube.com/content.php?pageid=137>, Accessed on Nov. 14, 2014, 2009, 8 pgs.

(Continued)

*Primary Examiner* — Randy P Gulakowski
*Assistant Examiner* — Ha S Nguyen
(74) *Attorney, Agent, or Firm* — Kwan & Olynick LLP

(57) ABSTRACT

Provided are fireproof flexible hoses, aircraft having fire suppression systems including such fireproof flexible hoses, and methods of forming such fireproof flexible hoses. A fireproof flexible hose includes an inner structure and an outer structure at least partially enclosing and directly interfacing the inner structure. The inner structure forms an inner surface of the fireproof flexible hose and includes a polyimide at least at the inner surface. The polyimide has good fireproofing and temperature resistant characteristics and, unlike other polymers, does not need to be thermally isolated when the hose is exposed to fire. The outer structure may be made from metal and/or non-metal and may provide mechanical support to the inner structure. The outer structure may have a convoluted shape to ensure flexibility of the overall hose assembly. In some examples, a set of gaps may be present between the outer and inner structures for additional flexibility.

20 Claims, 5 Drawing Sheets

(56) References Cited

U.S. PATENT DOCUMENTS

2011/0000572 A1\* 1/2011 Ramaswamy ............ B32B 1/08
 138/149

OTHER PUBLICATIONS

"American Firesleeve", Retrieved from the Internet: <http://www.americanfiresleeve.com/aviation-marine-as1072-firesleeve-high-temperature-heat-flame-fire-pyro-resistant-protection-sleeve-jacket-hose-wire-cable.html>, Accessed on Nov. 14, 2014, 2 pgs.
"Outgassing Database", EESA, European Space Agency, Retrieved from the Internet: <http://esmat.esa.int/services/outgassing_data/outgassing_data.html>, Accessed on Nov. 14, 2014, 2 pgs.
"Polyimide Liners for Cardiovascular Catheter Tubing", Putnam Plastics, Retrieved from the Internet: <http://www.putnamplastics.com/sites/default/files/Putnam%20Technology%20Sheet%20-20Polyimide%20Liners%20for%20Cardiovascular%20Catheter%20Tubing_0.pdf>, Accessed on Nov. 14, 2014, 3 pgs.
"Powerplant Installation and Propulsion System Component Fire Protection Test Methods, Standards, and Criteria", U.S. Dept. of Transportation, Advisory Circular, Retrieved from the Internet: <http://www.faa.gov/documentLibrary/media/Advisory_Circular/AC20-135.pdf>, Accessed on Nov. 14, 2014, 1990, 18 pgs.

\* cited by examiner

FIREPROOF FLEXIBLE HOSES WITH POLYIMIDE INNER STRUCTURES

BACKGROUND

Some hoses, such as hoses used in fire suppression systems, need to withstand direct fire exposure and remain operational during this exposure for prolonged periods of time. These hoses may be referred to as fireproof hoses. Fireproofing of a hose is conventionally achieved by adding fire sleeves and/or thermal insulation layers. A fire sleeve is typically formed from a silicone rubber. The fire sleeve surrounds other components, such as inner structural components and/or fittings. However, the silicone rubber ablates when subjected to the direct fire and, after some time may, expose internal components of the hose with undesirable results. On the other hand, metal sleeves are often too rigid to when flexibility is needed for fireproof hoses, such as feeding the hose in tight spaces. Furthermore, metal sleeves easily conduct heat due to their high thermal conductivities and cannot be positioned next to component with low melting points. Adding thermal insulation layers helps to overcome this problem, but these layers reduce the overall flexibility of the hose and add to the weight of the hose. Specifically, effective thermal isolation is only achieved when sufficiently thick layers of a thermally insulating material are added. The thickness allows to reduce heat transfer and to maintain the temperature gradient across the hose wall for sufficient periods of time. Therefore, there remains a need for light-weight, flexible, fireproof hoses.

SUMMARY

Provided are fireproof flexible hoses, aircraft having fire suppression systems including such fireproof flexible hoses, and methods of forming such fireproof flexible hoses. A fireproof flexible hose includes an inner structure and an outer structure at least partially enclosing and directly interfacing the inner structure. The inner structure forms the inner surface of the fireproof flexible hose. The inner structure includes a polyimide at least at the inner surface. The polyimide has good fireproofing and temperature resistant characteristics and, unlike other polymers, does not need to be thermally isolated when the hose is exposed to direct fire. The fireproof flexible hose may operate at ambient temperature of 2000° F. for at least 15 minutes without compromising its functions, such as delivery of fire suppressing materials. It should be noted that the inner structure may be damaged during this exposure while remaining functional. The outer structure may be made from metal or non-metal and may provide mechanical support to the inner structure. The outer structure may have a convoluted shape to ensure flexibility of the overall hose assembly. In some examples, a set of gaps may be present between the outer and inner structures for additional flexibility.

In some examples, a fireproof flexible hose includes two structures: an inner structure and a first outer structure. The inner structure forms the inner surface of the fireproof flexible hose. In some embodiments, the inner structure forms the entire inner surface. Alternatively, other components, such as fittings may form a portion of the inner surface of the hose. The fireproof flexible hose may include additional structures. However, the inner structure and a first outer structure remain in direct physical contact with each other despite presence of other structures.

The inner structure includes a polyimide at least at the inner surface. In some embodiments, the entire inner structure is formed from the polyimide. As noted above, polyimides have good fire resistant and temperature resistant characteristics and do not need to be thermally isolated when the fireproof flexible hose is exposed to fire. As such, the inner structure can directly interface the first outer structure without a need for intermediate thermal isolation layers typically used in conventional fireproof hoses.

In some examples, the inner surface formed by the inner structure is smooth. For purposes of this disclosure, a smooth surface is defined as a surface than has a surface roughness of less than 125 micro-inch based on an Average Arithmetic Roughness Height (AARH). The smooth surface may have a coefficient of friction of less than 1.5 or more specifically, less than 1.2 or even between about 0.4 and 1.0. This coefficient of friction allows efficient transport of fluid within the hose.

In some examples, the polyimide of the inner structure is one or more of the following materials: poly(4,4'-oxydiphenylene-pyromellitimide), 4,4-oxydiphthalic anhydride/3,4-oxydianiline, 3,3,4,4-benzophenenone-tetracarboxylic dianhydride/4,4-oxydianiline, 3,3,4,4-benzophenenone-tetracarboxylic dianhydride/4,4-diaminodiphenyl sulfone, and other non metallic materials. In some embodiments, the inner structure also includes a filler. Some examples of suitable filler materials include glass fibers, ceramic fibers, carbon fibers, metal fibers, aramid fibers, and other fibers. The filler may be added for mechanical reinforcement of the inner structure and improve its fire resistance and thermal resistance characteristics.

In some examples, the inner structure further comprises polytetrafluoroethylene (PTFE) at least at the inner surface. It should be noted that the PTFE is present at the surface together with the polyimide. The PTFE may be used to make the inner surface smoother and to increase the chemical resistance of the inner structure. However, the PTFE addition may reduce the fire resistance and temperature resistance characteristics of the inner structure. As such, in some embodiments, the concentration of PTFE in the inner structure is less than 5% by volume, such as between about 2-3% by volume, at least at the surface. The material of the inner structure may be selected such that the inner structure is impervious to fluids to prevent absorption of fluids into the inner structure. A fluid repealing layer or coating or membrane of various materials, e.g., silicone, a nano coating or another type of fluid repealing material, coating, spray or membrane may be used on the inner surface of the inner structure and in some embodiments other surfaces (e.g., front, back and side surfaces) to protect the inner structure from fluids. In some embodiments, the inner surface of the inner structure includes a fluid repealing material.

The first outer structure may at least partially enclose the inner structure. In some examples, the first outer structure completely encloses the inner structure such that the inner structure is not exposed and cannot be contacted by the direct fire. Alternatively, a portion of the inner structure may protrude to the outer surface of the hose since the inner structure is made from the fire resistant material, such as the polyimide.

In some examples, the first outer structure has a convoluted shape. The convoluted shape allows the fireproof flexible hose to be flexible even when the first outer structure is formed from metals or other rigid non-metal materials. Furthermore, the convoluted shape provides good mechanically supports and protects the inner structure. The convoluted shape also allows forming air gaps between the first outer structure and the inner structure for additional flexibility and thermal insulation.

The inner structure is configured to isolate the first outer structure from a material (e.g., a liquid, gas, solids, slurry, and the like) contained within the inner structure during operation of the fireproof flexible hose. Specifically, when the material is transported through the fireproof flexible hose, the first outer structure does not come in contact with the material. This feature may be important when the first outer structure is heated up when exposed to the direct fire, while the material is transported through the fireproof flexible hose is relatively cold. A high temperature gradient across the first outer structure may cause the mechanical failure, such as cracking. Furthermore, as noted above, the first outer structure may be configured to isolate the inner structure from the environment in which the fireproof flexible hose operates. For example, if the fireproof flexible hose is subjected to direct fire, the first outer structure prevents the fire from reaching the inner structure.

In some examples, the fireproof flexible hose includes a fitting attached to the first outer structure. The inner structure may protrude through the fitting and may form a seal on the face of the fitting. This face may be referred to as a front face of the fitting and may extend within the plane substantially orthogonal to the axial direction of the fireproof flexible hose or at least substantially orthogonal to the axial direction of the fitting. In some examples, the fitting is welded or otherwise attached to the first outer structure thereby providing an integrated enclosure to the inner structure.

In some examples, the inner structure is an extruded tube. The inner structure may be extruded prior to its coupling to the first outer structure. For example, the inner structure may be a thin walled tube that is inserted into a convoluted metal hose after forming the inner structure. Alternatively, the inner structure may be formed (e.g., extruded) within the first outer structure. For example, a material forming the inner structure may be flown into the first outer structure.

In some examples, the inner structure has a non-uniform thickness along the length of the fireproof flexible hose. For example, a portion of the inner structure may extend into convolutions of the first outer structure thereby improving mechanical engagement between the inner structure and the first outer structure. As such, even when the inner structure becomes soft during heating (e.g., during the direct fire exposure of the hose), the first outer structure helps the inner structure to maintain its shape and prevent the inner structure from collapsing and blocking the hose. At the same time, the inner surface formed by the inner structure may be substantially smooth (e.g., may have a substantially cylindrical shape, when the fireproof flexible hose is extended along its center axis).

In some examples, the inner structure and the first outer structure form a first set of unfilled gaps in between the inner structure and convolutions of the first outer structure. More specifically, the first set of unfiled gaps may be formed between the inner structure and the portions of the convolutions that do not directly interface with the inner structure. The portion of the inner structure may partially extend into the convolutions of the first outer structure thereby making the gaps smaller or not extend into the convolution. For example, the outer surface of the inner structure may be substantially smooth and the thickness of the inner structure may be substantially uniform. In some examples, the first set of unfilled gaps is sealed. More specifically, these gaps may be sealed from the environment by the first outer structure such that when the fireproof flexible hose is exposed to the direct fire, the fire does not penetrate into the gaps. Furthermore, these gaps may be sealed from the interior of the fireproof flexible hose by the inner structure such that when the fireproof flexible hose is used to transport a material, this material cannot get into the gaps.

In some examples, the first outer structure may form the outer surface of the fireproof flexible hose. In other words, the fireproof flexible hose does not have any other structures enclosing the first outer structure or, more generally, covering the first outer structure. In this case, the first outer structure is the only outer structure of the fireproof flexible hose. It should be noted that in this example, an additional portion of the outer surface of the fireproof flexible hose may be formed by fittings and/or other components that are not parts of the first outer structure and that do not cover the first outer structure.

In some examples, the first outer structure comprises a metal. Alternatively, a non-metal may be used for the first outer structure. Some examples of suitable materials include steel or, more specifically, stainless steels (ferritic or austenitic), inconel (i.e., an austenitic nickel-chromium-based super-alloy), titanium, reinforced fiberglass, ceramic, carbon matrix, composite, either solid or honeycomb, or others. In general, any material that is fire resistant and is capable of providing mechanical support while being exposed to direct fire is suitable for the first outer structure.

In some examples, the fireproof flexible hose also includes a second outer structure at least partially enclosing and directly interfacing the first outer structure. In these examples, the second outer structure may form at least a portion of the outer surface of the fireproof flexible hose. In some embodiments, the second outer structure may completely enclose the first outer structure. Alternatively, a portion of the first outer structure may extend beyond the second outer structure such that the external surface is at least partially formed by the first outer structure.

The second outer structure and the first outer structure may form a second set of unfilled gaps in between these two structures. This second set of unfilled gap may be isolated from the inner structure or, more specifically, from the first set of unfilled gaps formed by the first outer structure, in some examples. The second outer structure may include one or more materials selected from the group consisting of silicone rubber, polyimide, reinforced fiberglass, ceramic, carbon matrix, aramid, composite, either solid or honeycomb and others. The second outer structure may protect the first outer structure from the environment (e.g., from oxidation). Furthermore, the second outer structure may form an electrically insulating barrier over the first outer structure. In some embodiments, the second outer structure may include an a coating, such as a silicone coating and or a nano coating or other like coating, that prevents adsorptions of fluids into the second outer structure. The second outer structure may include a membrane or a cover to isolate this structure from the environment or, more specifically, from fluids that may be present in the environment.

Provided also is an aircraft including a fire suppression system. The system includes a fireproof flexible hose. Various examples of this fireproof flexible hose are described elsewhere in this document. Other components of the system may include a fire extinguishing source, to which the fireproof flexible hose is connected. In some embodiments, the fireproof flexible hose includes an inner structure forming the inner surface of the fireproof flexible hose. The inner structure comprises a polyimide at least at the inner surface. The inner surface may be smooth. The fireproof flexible hose may also include a first outer structure at least partially enclosing and directly interfacing the inner structure. The first outer structure may have a convoluted shape. The inner structure is configured to isolate the first outer structure from a liquid contained within the inner structure during operation of the fireproof flexible hose.

Also provided is a method of forming a fireproof flexible hose. The method may involve inserting an inner structure into a first outer structure. The inner structure forms an inner surface of the fireproof flexible hose. The inner structure includes a polyimide at least at the inner surface. The inner surface is smooth. After inserting, the first outer structure at least partially encloses and directly interfaces the inner structure. The first outer structure has a convoluted shape. The inner structure is configured to isolate the first outer structure from a liquid contained within the inner structure during operation of the fireproof flexible hose.

These and other embodiments are described further below with reference to the figures.

DETAILED DESCRIPTION

Figure 1:
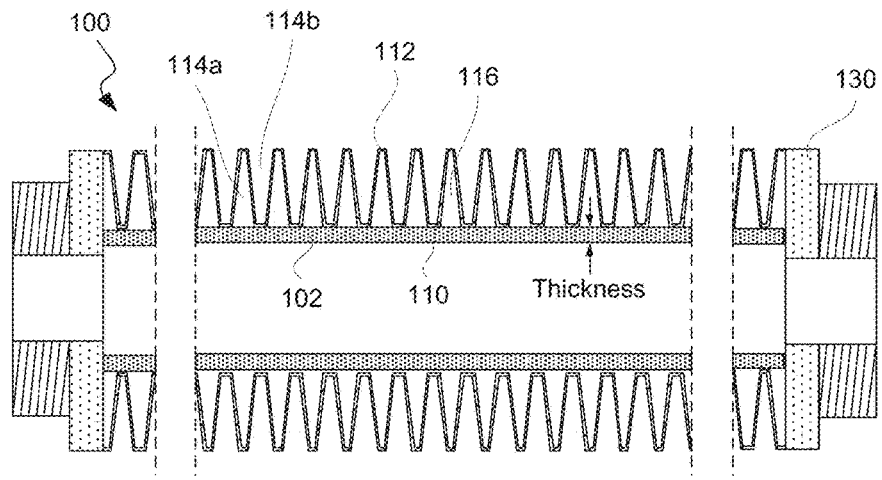
FIG. 1 is a cross-sectional view of a fireproof flexible hose having an inner structure including a polyimide, in accordance with some examples.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these examples are not intended to be limiting.

Introduction

Many applications require fireproof flexible hoses. Some examples of such applications include fire suppression systems on aircraft and other vehicles or structures, fuel delivery systems, air systems, hydraulic systems, oil systems, oxygen systems and other gas or liquid systems. Conventional fireproof hoses include several layers of different materials in order to provide thermal isolation and other operating characteristics. This multilayered construction has poor flexibility and heavy weight making these hoses unsuitable for many application, in particular for aircraft and aerospace applications, where flexibility and weight are major considerations.

While many conventional fireproof hoses, such as hoses used for fuel delivery, strive to be chemically inert when in contact with materials transported by these hoses, many applications do not need chemical inertness at the levels provided by these conventional hoses. One such application is a fire suppression system, in which a fire suppressing material, such as foam, liquid, gas, solid, or a combination thereof, is only delivered in emergency and for a relatively short period of time in comparison, for example, to a fuel delivery hose. The hoses used in these applications remain unfilled most of the time. Furthermore, even if the hose is not chemically inert when in contact with materials transported by these hoses, the hose may be still be used for the short period of time.

Relaxing the chemical compatibility requirements opens doors to new materials, such as polyimides. The polyimides are not commonly used to form inner surfaces of conventional fireproof flexible hoses because of their chemical inertness limitations as well as high surface roughness in comparison to, for example, PTFE. While PTFE is inert and provides a very smooth surface (coefficient of friction in the range of 0.04 to 0.1), PTFE degrades at approximately 600° F. making it unsuitable for high temperature applications, especially when used on surfaces. For example, the degraded PTFE (e.g., exposed to high temperature) may plug the hose during its operation. As such, when PTFE is used to form the inner surface of a fireproof hose, the PTFE structure is thermal isolated from the exterior of the hose. On the other hand, polyimides are fire resistant and can withstand high temperatures. The polyimides tend to form rougher surfaces than, for example, PTFE. For example, polyimide surfaces often have a coefficient of friction of less than 1.5 or, more specifically, less than 1.2 or even in the range of 0.4 to 1, which is about ten times higher than that of a PTFE. Nevertheless, this coefficient of friction and the surface toughness of less than 125 micro-inch AARH, still allow to use polyimides on inner surfaces for many applications, such as delivering fire retarding materials. Because of these unique properties, the polyimides can be used to form inner surfaces of fireproof flexible hoses without a need for thermal isolating layers to protect these layers from high temperature environment, such as when the exterior of the hose is exposed to direct fire.

Provided are fireproof flexible hoses, each hose including at least an inner structure and an outer structure at least partially enclosing and directly interfacing the inner structure. The inner structure forms the inner surface of the fireproof flexible hose and includes a polyimide at least at that inner surface. In some examples, most of the inner surface is formed by the polyimide. The outer structure may be made from metal, such as stainless steel, or a non-metal and may provide mechanical support to the inner structure during operation of the hose. The outer structure may have a convolute shape to ensure flexibility of the hose.

Examples of Fireproof Flexible Hose

Figure 2:
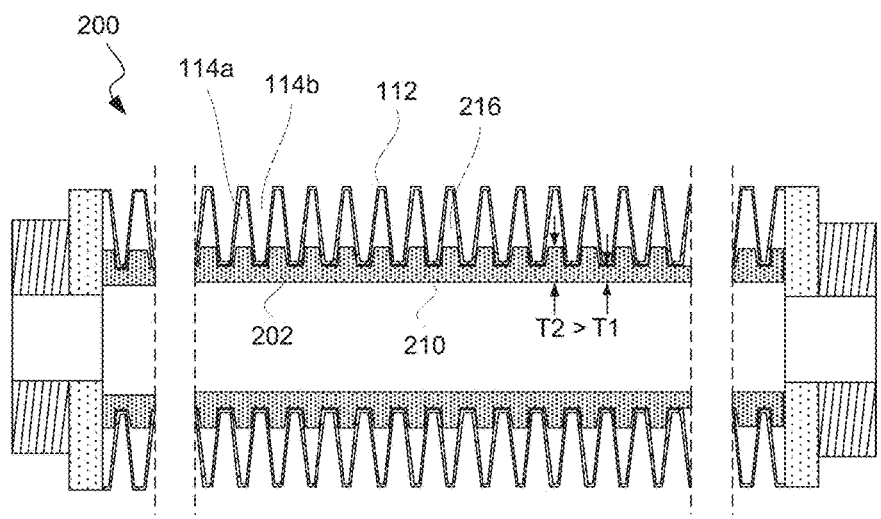
FIG. 2 is a cross-sectional view of a fireproof flexible hose having an inner structure with a variable thickness partially extending into the first outer structure, in accordance with some examples.
Figure 3:
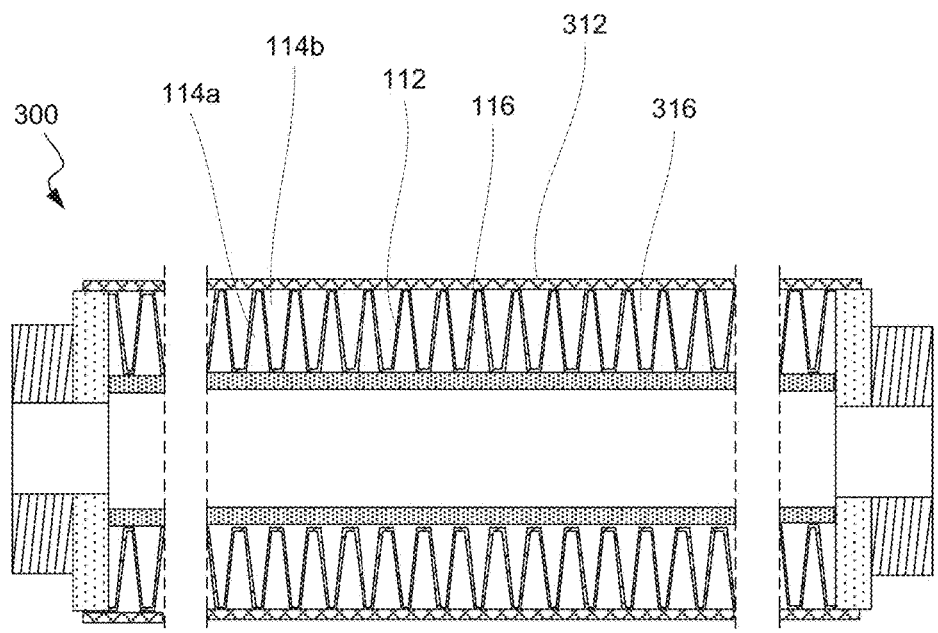
FIG. 3 is a cross-sectional view of a fireproof flexible hose having two outer structures disposed over an inner structure and forming two sets of unfilled gaps, in accordance with some examples.

FIG. 1 is a cross-sectional view of fireproof flexible hose 100 having inner structure 102, in accordance with some examples. Inner structure 102 forms inner surface 110 of fireproof flexible hose 100. Inner structure 102 includes a polyimide, at least at inner surface 110. In some examples, inner structure 102 forms the entire inner surface 110 as, for example, shown in FIG. 3 and further described below with reference to FIG. 4. Alternatively, other components, such as fitting 130 may form a portion of inner surface 110 as, for example, is shown in FIGS. 1-3. It should be noted that inner structure 102 comes in contact with a material transferred through fireproof flexible hose 100 during operation of fireproof flexible hose 100 and protects first outer structure 112 from this material. As such, inner structure 102 at least partially protects other components of fireproof flexible hose 100, such as first outer structure 112 from that transferred material.

As noted above, inner structure 102 includes a polyimide at least at inner surface 110. The polyimide on inner structure 102 may be one of poly(4,4'-oxydiphenylene-pyromellitimide), 4,4-oxydiphthalic anhydride/3,4-oxydianiline, 3,3,4,4-benzophenenone-tetracarboxylic dianhydride/4,4-oxydianiline, 3,3,4,4-benzophenenone-tetracarboxylic dianhydride/4,4-diaminodiphenyl sulfone, and other similar polyimides. In some examples, the polyimide represent more than 90% by volume of inner structure 102 or even more than 95% by volume.

In some examples, inner structure 102 also includes one or more fillers and/or additives. The filler may be used to improve mechanical strength of inner structure 102 and, in some examples, improve its temperature resistant characteristics. Such additives, which may be functional (e.g., chemically bond to the polyimide of inner structure 102) or inert, may be provided to be in powder, particulate, flake, fiber, or other form. The additives may be electrically-conductive materials, microwave-attenuating materials, thermally-conductive materials, lubricating materials (e.g., molybdenum disulfide), wetting agents, surfactants, stabilizers, antioxidants, dispersants, pigments, antistatic agents, coupling agents (e.g., titanates), chain extending oils, flow modifiers, blowing agents, foaming or anti-foaming agents, reinforcements (e.g., glass, carbon, or textile fibers, silanes, peroxides, film-reinforcing polymers, metals and other agents), emulsifiers, thickeners, and/or flame retardants and other fillers (e.g., aluminum trihydrate, antimony trioxide, metal oxides and salts, intercalated graphite particles, phosphate esters, decabromodiphenyl oxide, borates, siloxanes, phosphates, halogenated compounds, glass, silica).

In some examples, inner structure 102 further comprises PTFE at least at inner surface 110. The PTFE may be used to make inner surface 110 smoother and increase the chemical resistance of inner structure 110. However, addition of the PTFE may reduce the fire resistance and temperature resistance characteristics of inner structure 102. As such, in some examples, the concentration of PTFE in inner structure 102 is less than 5% by volume, such as between about 2-3% by volume. The PTFE may be distributed substantially uniform throughout inner structure 102. Alternatively, more PTFE may be present at inner surface 110 than away from inner surface 110. It should be also noted that inner surface 110 also includes the polyimide even when PTFE is present at the surface. In some examples, most of inner surface 110 is formed by the polyimide of inner structure.

In some examples, inner structure 102 is an extruded tube. Inner structure 102 may be extruded prior to its coupling with first outer structure 112 or may be formed within first outer structure 112. For example, inner structure 102 may be a thin walled tube that is inserted into a convoluted metal hose that is operable as first outer structure 112.

Fireproof flexible hose 100 also includes first outer structure 112. First outer structure 112 may at least partially enclose inner structure 102. In some examples, first outer structure 112 completely encloses inner structure 102 as, for example, is shown in FIG. 1. Alternatively, a portion of inner structure 102 may protrude to the outer surface of fireproof flexible hose 100 since inner structure 102 is made from the fire resistant material or, more specifically, from the polyimide.

First outer structure 112 directly interfaces inner structure 102 as, for example, is shown in FIG. 1 or FIG. 2. It should be noted that there are no intermediate structures that separate first outer structure 112 from inner structure 102 besides gaps. Since inner structure 102 is formed from the temperature resistant material, there is no need to form a thermal barrier, which is commonly used in conventional fireproof hoses that use other polymers for their internal components. For example, the operating temperatures of 4,4'-oxydiphenylene-pyromellitimide extends up to 752° F. At the same time, 4,4'-oxydiphenylene-pyromellitimide does not burn. 4,4'-oxydiphenylene-pyromellitimide can easily withstand 2000° F. for at least 15 minutes, which is a requirement for some aerospace applications.

In some examples, first outer structure 112 has a convoluted shape. The convoluted shape allows fireproof flexible hose 100 to be flexible even when first outer structure 112 is formed from a metal and some other rigid material. Furthermore, the convoluted shape still mechanically supports and protects inner structure 102 and allows using fireproof flexible hose 100 for transporting pressurized fluids and gases while retaining its operability. Without inner structure 102 that forms smooth inner surface 110, the convoluted shape of first outer structure 112 is too resistant to the flow of materials through fireproof flexible hose 100. The pressure drop in any flow of liquid, gas, or solids due to the convolutions is too high when compared to smooth inner surface 110 of inner structure 102. For fire extinguishing applications, any flow resistance and impediment in the timely delivery of the extinguishing agent due to the high pressure drops associated with the rough surface with convolutions negatively impacts the fire extinguishing capability of the system. Inner surface 110 may have a smooth surface, e.g., less than 125 micro-inches AARH and may have a coefficient of friction of less than 1.5 or, more specifically, less than 1.2, such as within a range of 0.4 to 1.0, to help with the delivery of the extinguishing agent in these applications.

Inner structure 102 is configured to isolate first outer structure 112 from a material contained and transferred within inner structure 102 during operation of fireproof flexible hose 100. The material may be a liquid, gas, or solid or a combination thereof. For example, pentafluoroethane may be used as an extinguishing agent that is transported using fireproof flexible hose 100 in case of fire emergency. Pentafluoroethane is liquid when stored at a high pressure in a container. When released, pentafluoroethane converts to gas at ambient conditions. While transported through fireproof flexible hose 100, pentafluoroethane may be a liquid, gas, or a combination of a liquid and gas also known as a dual phase. When the material is transported through fireproof flexible hose 100, first outer structure 112 does not come in contact with the material. The material may primarily contact inner structure 102 and, in some examples, other components of fireproof flexible hose 100, such as fitting 130. In some examples, the material transferred through fireproof flexible hose 100 only contacts inner structure 102. These examples are further described below with reference to FIG. 4.

First outer structure 112 is configured to isolate inner structure 102 from the environment in which fireproof flexible hose 100 operates. For example, if the exterior of fireproof flexible hose 100 is subjected to direct fire, first outer structure 112 prevents the fire from reaching inner structure 102. When fireproof flexible hose 100 is exposed to an external fire, first outer structure 112 may not directly contact inner structure 102. Furthermore, first outer structure 112 provides mechanical supports and protects inner structure 102 from mechanical damage. For example, inner structure 102 may be a thin wall tube that on its own may not be capable of withstanding the internal pressure of the material when the material is being transferred through fireproof flexible hose 100.

In some examples, first outer structure 112 includes a metal or non-metal. Some examples of suitable materials include steel or, more specifically, stainless steel (ferritic or austenitic), inconel, titanium, reinforced fiberglass, ceramic, composite, carbon matrix and others, both solid and/or honeycomb.

In some examples, fireproof flexible hose 100 includes fitting 130 attached to first outer structure 112 as, for example shown, in FIGS. 1-4. Fitting 130 may be used to attach fireproof flexible hose 100 to other components, such as a fire extinguishing liquid source, nozzle, and other like components, some of which are described below in more details with reference to FIG. 5.

Figure 4:
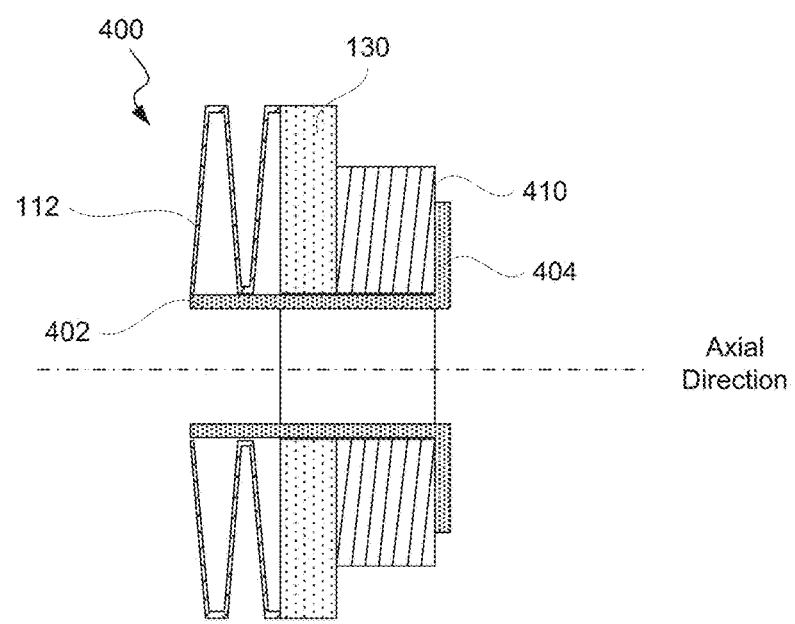
FIG. 4 is a cross-sectional view of a portion of a fireproof flexible hose having an inner structure extending to the front face of a fitting, in accordance with some examples.

As shown in FIG. 4, inner structure 402 may protrude through fitting 130 and may form a seal at front face 410 of fitting 130. Front face 410 may extend within the plane substantially orthogonal to the axial direction of fireproof flexible hose 100. When fitting 130 is connected to another device (e.g., the fire extinguishing agent source), portion 404 of inner structure 402 extending over front face 410 of fitting 130 may be compressed between this front face 410 and the other device thereby forming a seal.

In some examples, fitting 130 is attached to first outer structure 112 thereby providing an integrated enclosure to inner structure 102. More specifically, fitting 130 may be welded, brazed, resistance welded, fusion welded, threaded, clamped, coupled with a coupling, fastened with fasteners, or cryogenically attached to first outer structure 112.

As shown in FIG. 2, inner structure 202 may have a non-uniform thickness along the length of fireproof flexible hose 200. Specifically, a portion of inner structure 202 may extend into inner convolutions 114a of first outer structure 112. In this case, inner structure 202 has a greater thickness at the location of inner convolutions 114a (shown as T2 in FIG. 2) than in between these convolutions 114a (shown as T1 in FIG. 2). At the same time, inner surface 210 formed by inner structure 202 may be substantially smooth. For example, inner surface 210 may have a substantially cylindrical shape when fireproof flexible hose 200 is extended along its center axis. Even though, the portion of inner structure 202 extends into inner convolutions 114a, fireproof flexible hose 200 may still have unfilled gaps 216 within remaining portions of inner convolutions 114a, i.e., portions of inner convolutions 114a that are not filled with inner structure 202.

Returning to FIG. 1, in some examples, inner structure 102 and first outer structure 112 form unfilled gaps 116 in between inner structure 102 and convolutions of first outer structure 112 not directly interfacing the inner structure 102. Unfilled gaps 116 may be referred to a first set of unfilled gaps to distinguish these gaps from other unfilled gaps, such as gaps formed on the other side of first outer structure 112 as further described below with reference to FIG. 1. When inner structure 102 has a uniform thickness (as shown in FIG. 1) such that inner structure 102 does not extend into inner convolutions 114a of first outer structure 112, the volume of unfilled gaps 116 may be substantially the same as the volume of inner convolutions 114a. Alternatively (as shown in FIG. 2), when inner structure 202 has a non-uniform thickness such that portions of inner structure 202 extend into inner convolutions 114a, the volume of unfilled gaps 216 may be smaller than the volume of inner convolutions 114a. In some examples, the ratio of the volume of unfilled gaps 116 to the volume of inner convolutions 114a is between about 50% and 100% or, more specifically, between about 60% and 90%, or between about 80% and 90%. The ratio values define structures in which inner convolutions 114a remain substantially unfilled to provide flexibility to fireproof flexible hose 100. Furthermore, the air, other gas, or even vacuum trapped in unfilled gaps 116 may help with reducing thermal conductivity of fireproof flexible hose 100. Even though the material of inner structure 102 is thermal and fire resistant, it may be beneficial to keep this structure and materials transported by fireproof flexible hose 100 at lower temperatures, if possible. At the same time, allowing for partial filling of inner convolutions 114a (as shown in FIG. 2) improves mechanical coupling between inner structure 102 and first outer structure 112.

In some examples, unfilled gaps 116 (or 216) are sealed, regardless of filling inner convolutions 114a. More specifically, these gaps may be sealed from the environment around fireproof flexible hose 100. This sealing may be provided by first outer structure 112 such that when fireproof flexible hose 100 is exposed to the direct fire, the fire does not penetrate into gaps 116. This feature differentiates fireproof flexible hose 100 from conventional fireproof hoses that leave such gaps open to the environment. For example, some conventional fireproof hoses use vent holes in its convoluted shells to prevent pressure build up within the hose (e.g., due to outgassing of the internal components) and internal collapsing of the hose. Due to mechanical coupling between inner structure 102 and first outer structure 112 and due to thermal resistance of the materials used for inner structure 102, the risk of inner structure 102 collapsing is low. In some examples, gaps 116 are sealed from the interior of fireproof flexible hose 100 by inner structure 102 such that when fireproof flexible hose 100 is used to transport a material, this material cannot get into gaps 116.

In some examples, first outer structure 112 may form the outer surface of fireproof flexible hose 100 as, for example, shown in FIGS. 1 and 2. In other words, fireproof flexible hose 100 does not have any other structure enclosing first outer structure 112 or, more generally, covering first outer structure 112. In this case, first outer structure 112 is the only outer structure of fireproof flexible hose 100. It should be noted that in this example, an additional portion of the outer surface of fireproof flexible hose 100 may be formed by fitting 130 and/or other components that are not parts of first outer structure 112 and that do not cover first outer structure 112.

In some examples (as shown in FIG. 3), fireproof flexible hose 300 also includes a second outer structure 312 at least partially enclosing and directly interfacing first outer structure 112. In these examples, second outer structure 3012 may form at least a portion of the outer surface of fireproof flexible hose 100. Second outer structure 312 may completely enclose first outer structure 112 as, for example, shown in FIG. 3. Alternatively, a portion of first outer structure 112 may extend beyond second outer structure 312. In some examples, second outer structure 312 may enclose at least portions of fitting 130.

Second outer structure 312 and first outer structure 112 may form a second set of unfilled gaps 316 in between these two structures. Unfilled gaps 316 may be isolated from inner structure 102 or, more specifically, from the first set of unfilled gaps 116 formed by first outer structure 112 and inner structure 102. Unfilled gaps 316 may be also isolated from the environment and may protect first outer structure 112 from direct fire exposure. In some examples, portions of second outer structure 312 may extend into outer convolutions 114b of first outer structure 112 to improve mechanical coupling between second outer structure 312 and first outer structure 112.

In some examples, second outer structure 312 may include one or more of the following materials: poly(4,4'-oxydiphenylene-pyromellitimide), silicone rubber, metal, ceramic, fiberglass, carbon, aramid, composites, aerogel (organic or inorganic), or a combination thereof, either reinforced or unreinforced. Alternately, outer structure 312 may be a sleeve, or tape or cover installed over fireproof flexible hose 100. Second outer structure 312 may or may not expose the fittings 130. Second outer structure 312 may protect first outer structure 112 from the environment (e.g., from oxidation). Furthermore, second outer structure 312 may form an electrically insulating barrier over first outer structure 112. In this case, second outer structure 312 may be formed from an electrically insulating material.

Figure 5:
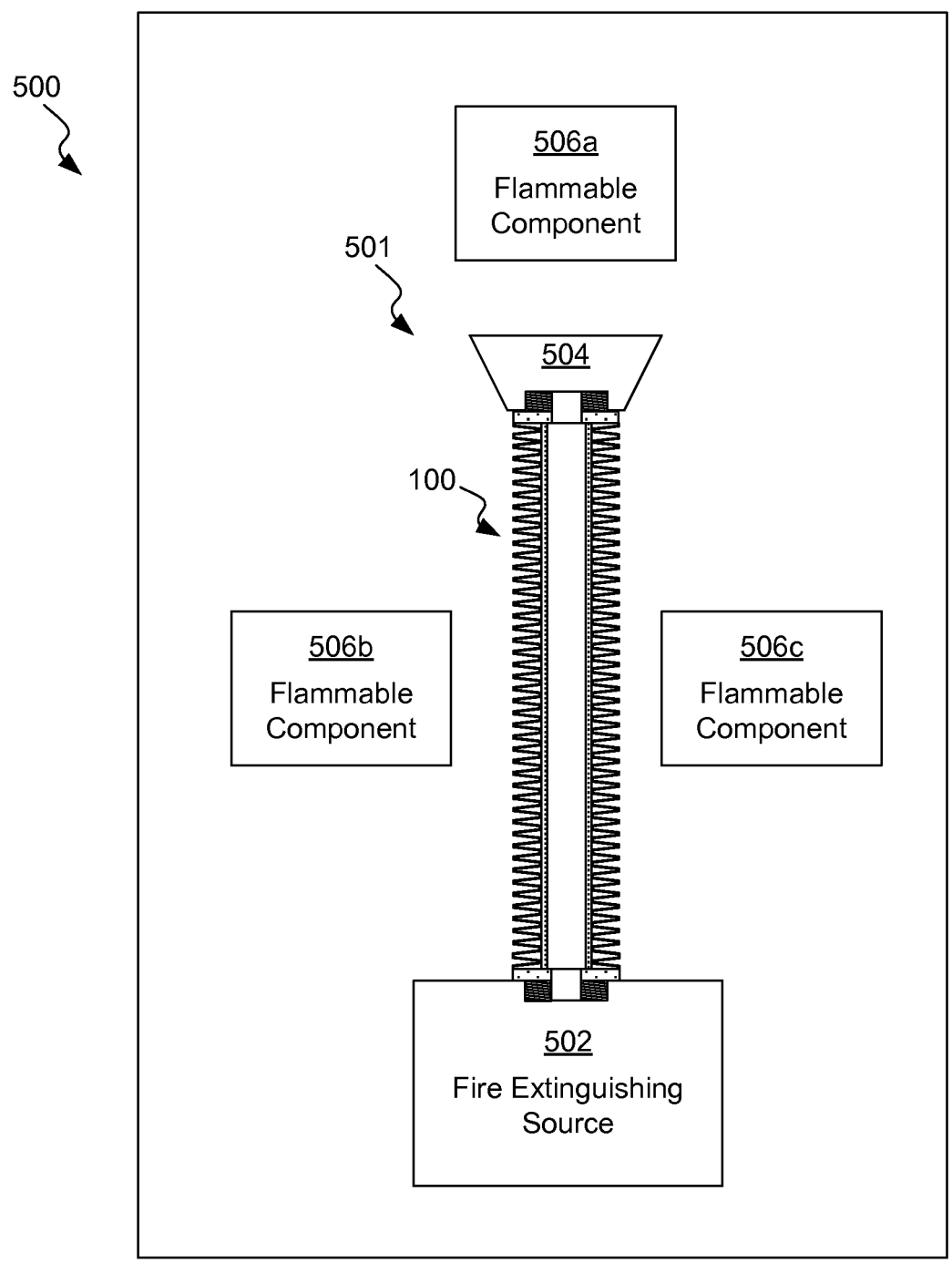
FIG. 5 is a schematic view of an aircraft having fire suppression system that includes a fireproof flexible hose and other components, in accordance with some examples.

Examples of Aircraft Having Fire Suppression Systems with Fireproof Flexible Hoses FIG. 5 is a schematic view of aircraft 500 having fire suppression system 501 that includes fireproof flexible hose 100, in accordance with some examples. Various examples of fireproof flexible hose 100 are described above. Other components of fire suppression system 501 may be fire extinguishing source 502 to which fireproof flexible hose 100 is connected. This connection may be made using, for example, fitting 130 of fireproof flexible hose 100. Fire extinguishing source 502 may contain a fire extinguishing material for extinguishing fire in the environment around fire suppression system 501. Fireproof flexible hose 100 may be also connected to nozzle 504 that distributes the fire extinguishing material with the environment. Also shown in FIG. 5 are flammable components 506a-506c that may cause the fire in the environment resulting in fireproof flexible hose 100 being exposed to the fire. It should be noted that fireproof flexible hose 100 is operable to deliver the fire extinguishing material for a prolonged period of time while being exposed to the fire. The flexibility feature of fireproof flexible hose 100 allows to route fireproof flexible hose 100 in the environment where fire suppression system 501 is installed, e.g., between flammable components 506a-506c and other component. Additional examples of aircraft systems are described below with reference to FIG. 7B.

Examples of Forming Fireproof Flexible Hoses

Figure 6:
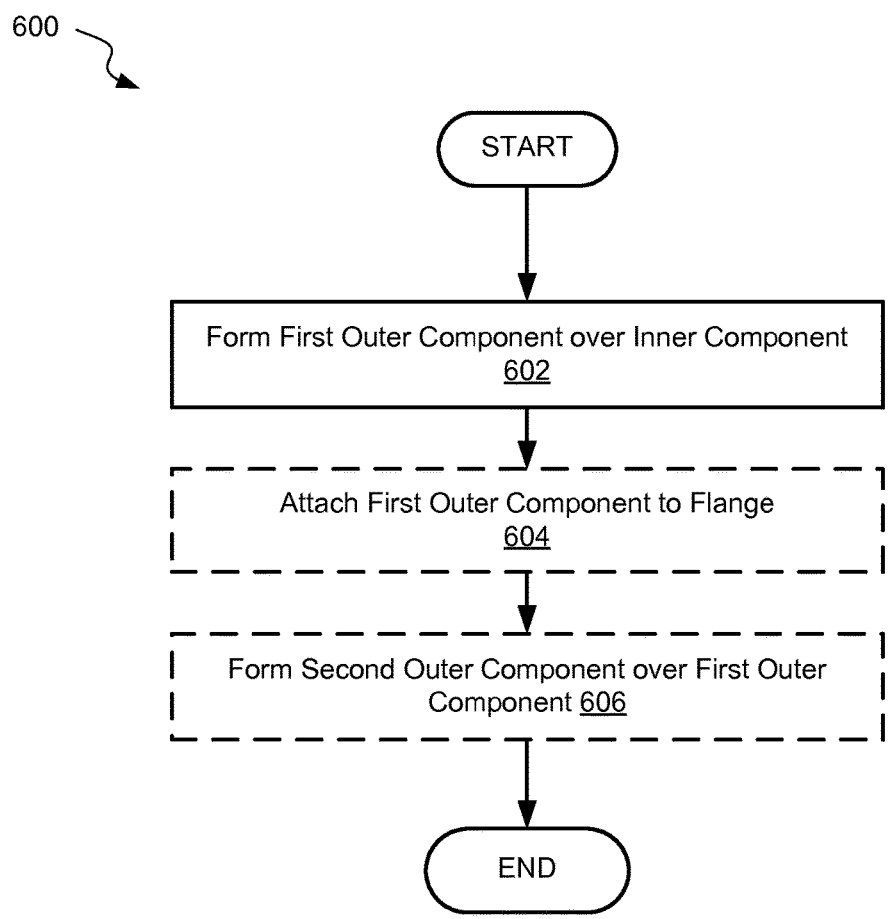
FIG. 6 is a process flowchart corresponding to a method of forming a fireproof flexible hose, in accordance with some examples.

FIG. 6 is a process flowchart corresponding to method 600 of forming a fireproof flexible hose, in accordance with some examples. Various examples of the fireproof flexible hose are described above. Method 600 may commence with forming a first outer component over the inner component during operation 602. In some examples, operation 602 involves inserting the inner structure into the first outer structure. For example, the inner structure may be a preformed tube, which may be inserted into the preformed first outer structure. Alternatively, the inner structure may be formed within the first outer structure. In some examples, method 600 also involves attaching a first outer component to a flange during operation 604. For example, the first outer component may be welded to the flange. Furthermore, method 600 may involve forming a second outer component over the first outer component during operation 606.

Examples of Aircraft

Figure 7A:
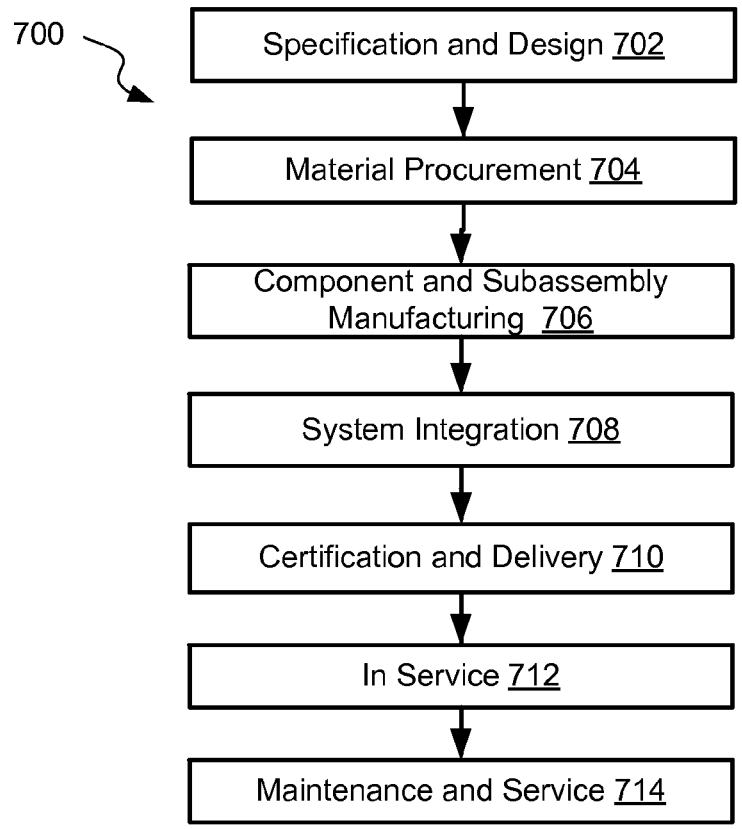
FIG. 7A is a process flowchart reflecting key operations in the life cycle of an aircraft from early stages of manufacturing to entering service, in accordance with some examples.

An aircraft manufacturing and service method 700 shown in FIG. 7A and an aircraft 730 shown in FIG. 7B will now be described to better illustrate various features of processes and systems presented herein. During pre-production, aircraft manufacturing and service method 700 may include specification and design 702 of aircraft 730 and material procurement 704. The production phase involves component and subassembly manufacturing 706 and system integration 708 of aircraft 730. Thereafter, aircraft 730 may go through certification and delivery 710 in order to be placed in service 712. While in service by a customer, aircraft 730 is scheduled for routine maintenance and service 714 (which may also include modification, reconfiguration, refurbishment, and so on). While the examples described herein relate generally to servicing of commercial aircraft, they may be practiced at other stages of the aircraft manufacturing and service method 700.

Each of the processes of aircraft manufacturing and service method 700 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 7B:
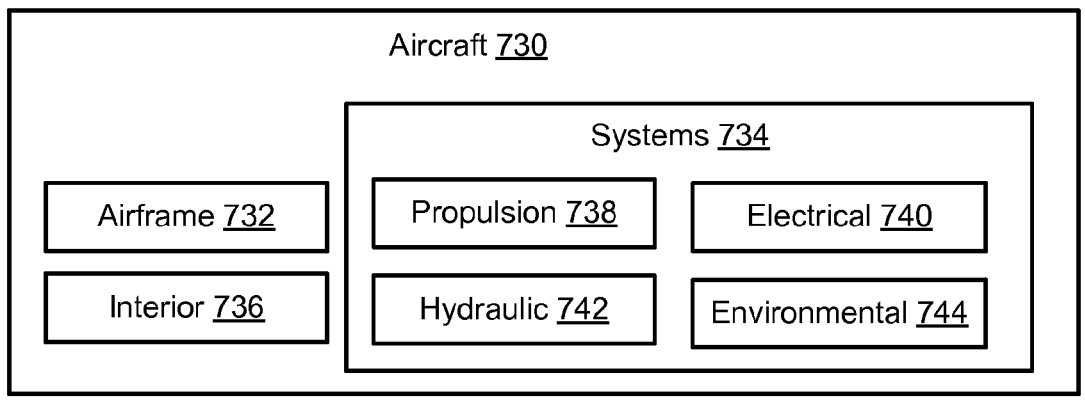
FIG. 7B is a block diagram illustrating various key components of an aircraft, in accordance with some examples.

As shown in FIG. 7B, aircraft 730 produced by aircraft manufacturing and service method 700 may include airframe 732, interior 736, and multiple systems 734. Examples of systems 734 include one or more of propulsion system 738, electrical system 740, hydraulic system 742, and environmental system 744. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 700. For example, without limitation, components or subassemblies corresponding to component and subassembly manufacturing 706 may be fabricated or manufactured in a manner similar to components or subassemblies produced while aircraft 730 is in service.

Also, one or more apparatus examples, method examples, or a combination thereof may be utilized during component and subassembly manufacturing 706 and system integration 708, for example, without limitation, by substantially expediting assembly of or reducing the cost of aircraft 730. Similarly, one or more of apparatus examples, method examples, or a combination thereof may be utilized while aircraft 730 is in service, for example, without limitation, to maintenance and service 714 may be used during system integration 708 and/or maintenance and service 714 to determine whether parts may be connected and/or mated to each other.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A fireproof flexible hose comprising:
an inner structure, forming an inner surface of the fireproof flexible hose,
wherein the inner structure comprises a polyimide at least at the inner surface,
wherein the inner surface is smooth; and
a first outer structure, at least partially enclosing and directly interfacing the inner structure,
wherein the first outer structure is a metal structure,
wherein the first outer structure has a convoluted shape, and
wherein the inner structure is configured to isolate the first outer structure from a material contained within the inner structure during operation of the fireproof flexible hose.

2. The fireproof flexible hose of claim 1, wherein the first outer structure fully encloses the inner structure.

3. The fireproof flexible hose of claim 1, further comprises a fitting attached to the inner structure, wherein the inner structure protrudes through the fitting and forms a seal at a face of the fitting.

4. The fireproof flexible hose of claim 1, wherein the fitting is attached to the first outer structure.

5. The fireproof flexible hose of claim 1, wherein the inner structure is an extruded tube.

6. The fireproof flexible hose of claim 1, wherein the inner structure has a non-uniform thickness along a length of the fireproof flexible hose.

7. The fireproof flexible hose of claim 6, wherein portions of the inner structure extend into spaces formed by convolutions of the first outer structure.

8. The fireproof flexible hose of claim 1, wherein the inner structure and the first outer structure form a first set of unfilled gaps in between the inner structure and portion of convolutions of the first outer structure not directly interfacing with the inner structure.

9. The fireproof flexible hose of claim 8, wherein the first set of unfilled gaps is sealed.

10. The fireproof flexible hose of claim 1, wherein the first outer structure forms an outer surface of the fireproof flexible hose.

11. The fireproof flexible hose of claim 1, wherein the first outer structure comprises a metal selected from the group consisting of steel, stainless steel, inconel, and titanium.

12. The fireproof flexible hose of claim 1, wherein the inner structure further comprises polytetrafluoroethylene at least at the inner surface.

13. The fireproof flexible hose of claim 1, wherein a concentration of polytetrafluoroethylene in the inner structure is less than 5% by volume.

14. The fireproof flexible hose of claim 1, wherein the polyimide of the inner structure is one or more materials selected from the group consisting of poly(4,4'-oxydiphenylene-pyromellitimide), 4,4-oxydiphthalic anhydride/3,4-oxydianiline, 3,3,4,4-benzophenenone-tetracarboxylic dianhydride/4,4-oxydianiline, and 3,3,4,4-benzophenenone-tetracarboxylic dianhydride/4,4-diaminodiphenyl sulfone.

15. The fireproof flexible hose of claim 1, further comprising a second outer structure at least partially enclosing and directly interfaces the first outer structure.

16. The fireproof flexible hose of claim 15, wherein the second outer structure and the first outer structure form a second set of unfilled gaps in between the second outer structure and the first outer structure.

17. The fireproof flexible hose of claim 16, wherein the second set of unfilled gaps is isolated from the inner structure.

18. The fireproof flexible hose of claim 15, wherein the second outer structure comprises one or more materials selected from the group consisting of polyimide, silicone rubber, a metal, fiberglass, ceramic, composite, carbon, aramid, an organic aerogel and inorganic aerogel.

19. An aircraft comprising:
a fire suppression system comprising:
a fireproof flexible hose comprising:
an inner structure forming an inner surface of the fireproof flexible hose,
wherein the inner structure comprises a polyimide at least at the inner surface,
wherein the inner surface is smooth; and
a first outer structure at least partially enclosing and directly interfacing the inner structure,
wherein the first outer structure has a convoluted shape, and
wherein the first outer structure is a metal structure,
wherein the inner structure is configured to isolate the first outer structure from a material contained within the inner structure during operation of the fireproof flexible hose.

20. A method of forming a fireproof flexible hose, the method comprising:
inserting an inner structure into a first outer structure,
wherein the inner structure forms an inner surface of the fireproof flexible hose,
wherein the inner structure comprises a polyimide at least at the inner surface,
wherein the inner surface is smooth,
wherein, after inserting, the first outer structure at least partially encloses and directly interfaces the inner structure,
wherein the first outer structure has a convoluted shape, and
wherein the first outer structure is a metal structure,
wherein the inner structure is configured to isolate the first outer structure from a material contained within the inner structure during operation of the fireproof flexible hose.

* * * * *